United States Patent
Kishikawa

(10) Patent No.: US 8,689,923 B2
(45) Date of Patent: Apr. 8, 2014

(54) SADDLE RIDING VEHICLE

(75) Inventor: Keisuke Kishikawa, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 24 days.

(21) Appl. No.: 13/539,498

(22) Filed: Jul. 2, 2012

(65) Prior Publication Data

US 2013/0020143 A1    Jan. 24, 2013

(30) Foreign Application Priority Data

Jul. 24, 2011 (JP) ................................ 2011-161468

(51) Int. Cl.
*B62K 11/04* (2006.01)

(52) U.S. Cl.
USPC ........ 180/219; 180/336; 280/291; 280/288.4; 280/293; 280/304.3; 74/473.1; 74/473.16

(58) Field of Classification Search
USPC ............... 180/219, 336; 280/291, 288.4, 293, 280/304.3; 74/473.1, 473.16
See application file for complete search history.

(56) References Cited

U.S. PATENT DOCUMENTS

| | | | |
|---|---|---|---|
| 7,882,756 B2* | 2/2011 | Mochizuki et al. | 74/335 |
| 7,896,119 B2* | 3/2011 | Suzuki | 180/230 |
| 2009/0249914 A1* | 10/2009 | Kashiwai et al. | 74/473.21 |
| 2013/0055841 A1* | 3/2013 | Nakamura et al. | 74/473.16 |

FOREIGN PATENT DOCUMENTS

| | | |
|---|---|---|
| JP | 3813422 B2 | 3/2002 |
| JP | 2010-195319 A | 9/2010 |

* cited by examiner

*Primary Examiner* — Marlon Arce

(74) *Attorney, Agent, or Firm* — Ditthavong Mori & Steiner, P.C.

(57) ABSTRACT

A saddle riding vehicle includes a vehicle body frame, a front wheel, a rear wheel, a power unit, a shift actuator, and an actuator guard. The power unit has a transmission and a shift mechanism for the transmission. The shift actuator is to actuate the shift mechanism and is attached to a lower portion of a side face of the power unit. The actuator guard is to protect the shift actuator from an obstacle and includes a guard frame and a guard member. The guard frame extends in a forward and backward direction of the saddle riding vehicle below the shift actuator. The guard frame is connected to the vehicle body frame. The guard member is connected to the guard frame and covers a lower face and an outer side face of the shift actuator.

10 Claims, 14 Drawing Sheets

SADDLE RIDING VEHICLE

CROSS-REFERENCE TO RELATED APPLICATIONS

The present application claims priority under 35 U.S.C. §119 to Japanese Patent Application No. 2011-161468, filed Jul. 24, 2011. The contents of this application are incorporated herein by reference in their entirety.

BACKGROUND OF THE INVENTION

1. Field of the Invention

This invention relates to a saddle riding vehicle.

2. Discussion of the Background

Such a saddle riding vehicle as described above is already known as disclosed in Japanese Patent Application Publication No. 2010-195319 described below. Further, a saddle riding vehicle wherein, in order to protect an engine when the vehicle falls sideways, an engine guard formed from a pipe member swollen sidewardly outwardly from the engine is fixed at an upper end portion thereof to a main frame and at a lower end portion thereof to a lower portion of a side face of the engine is already known as disclosed in Japanese Patent No. 3813422 described below.

Incidentally, in a saddle riding vehicle which includes a vehicle body frame and a shift actuator attached to a side face of a power unit supported on the vehicle body frame between a front wheel and a rear wheel and adapted to actuate a shift mechanism, the shift mechanism of a transmission is usually disposed at a lower portion in the power unit. Therefore, it is effective to dispose the shift actuator, which is attached to a side face of the power unit, at a lower portion of the side face proximate to the shift mechanism and connect the shift actuator directly to the shift mechanism in order to enhance the responsibility of the shift mechanism upon actuation of the shift actuator.

SUMMARY OF THE INVENTION

According to one aspect of the present invention, a saddle riding vehicle includes a vehicle body frame, a front wheel, a rear wheel, a power unit, a shift actuator, and an actuator guard. The front wheel is connected to the vehicle body frame. The rear wheel is connected to the vehicle body frame. The power unit is provided between the front wheel and the rear wheel and is supported by the vehicle body frame. The power unit has a transmission and a shift mechanism for the transmission. The shift actuator is to actuate the shift mechanism and is attached to a lower portion of a side face of the power unit. The actuator guard is to protect the shift actuator from an obstacle and includes a guard frame and a guard member. The guard frame extends in a forward and backward direction of the saddle riding vehicle below the shift actuator. The guard frame is connected to the vehicle body frame. The guard member is connected to the guard frame and covers a lower face and an outer side face of the shift actuator.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings.

DESCRIPTION OF THE EMBODIMENTS

Figure 1:
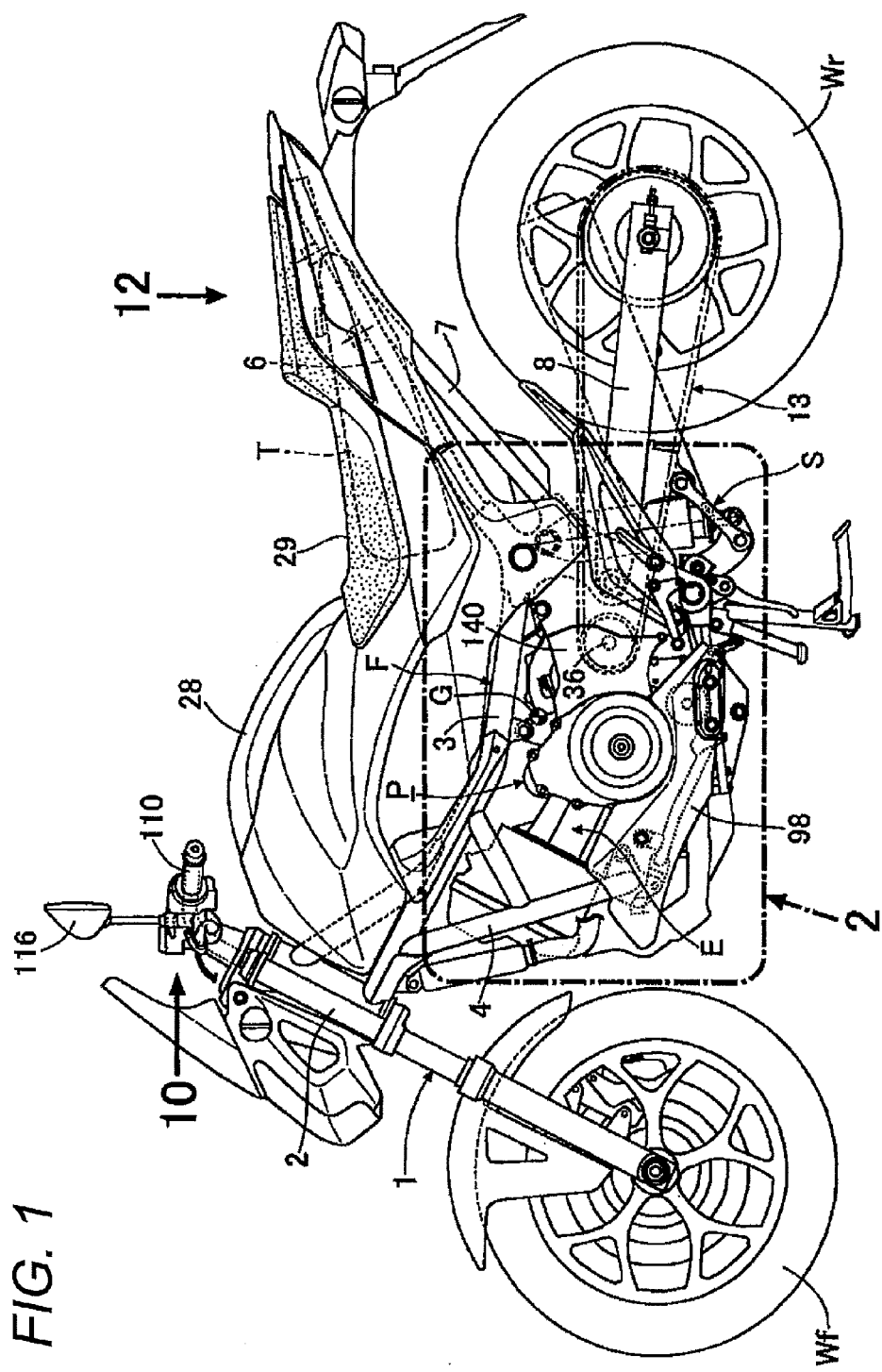
FIG. 1 is a left side elevational view of a motorcycle according to an embodiment of the present invention.

The embodiments will now be described with reference to the accompanying drawings, wherein like reference numerals designate corresponding or identical elements throughout the various drawings.

In the following, a saddle riding vehicle in which an embodiment is applied to a motorcycle is described with reference to the accompanying drawings. It is to be noted that the front, rear, left and right are represented with reference to the motorcycle.

Figure 2:
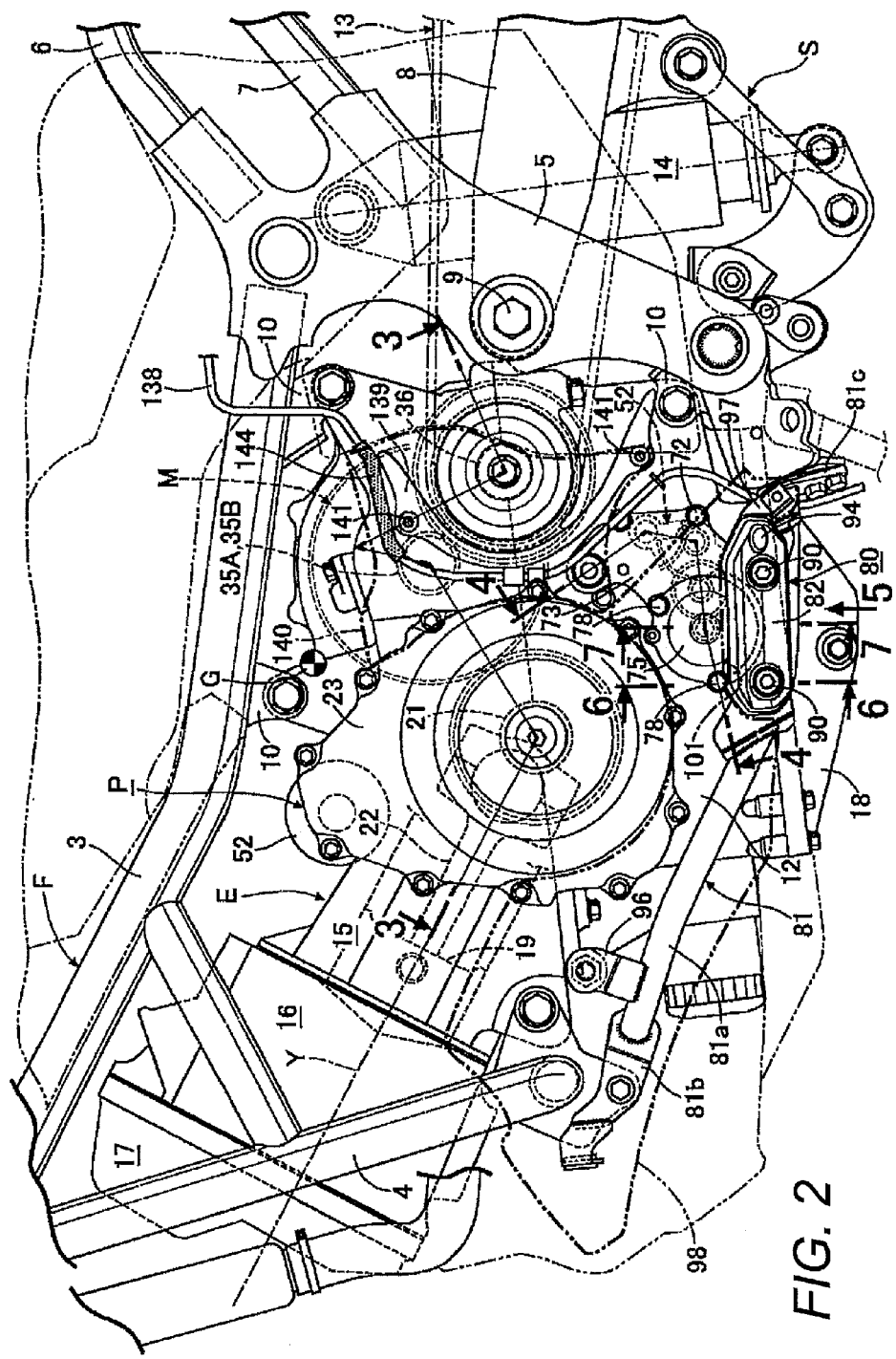
FIG. 2 is an enlarged view of a portion denoted by 2 in FIG. 1.

Referring to FIGS. 1 and 2, a vehicle body frame F of the motorcycle includes a head pipe 2 for supporting a front fork 1, on which a front wheel Wf is supported for rotation, for steering movement, a pair of left and right main frames 3, 3 extending rearwardly and downwardly with a mild slope from the head pipe 2, a pair of left and right down frames 4, 4 extending downwardly to the main frames 3, 3 with a steep slope from front end portions of the main frames 3, 3, a pair of left and right pivot frames 5, 5 (refer to FIG. 2) extending downwardly from rear ends of the main frames 3, 3, a pair of left and right seat rails 6, 6 extending rearwardly upwards from upper portions of the pivot frames 5, 5, and a stay 7 interconnecting an intermediate portion of each pivot frame 5 and a rear portion of each seat rail 6 on the same left or right side. A rear fork 8 on which a rear wheel Wr is supported for rotation is supported for upwardly and downwardly rocking motion at lower portions of the pivot frames 5, 5 through a pivot shaft 9 (refer to FIG. 2).

On the main frames 3, 3, down frames 4, 4 and pivot frames 5, 5, engine hangers 10, 10, ... (refer to FIG. 2) are provided so as to project toward a region surrounded by them, and a power unit P disposed in the region is coupled to the engine hangers 10, 10, ... by bolts. This power unit P is configured from a multi-cylinder, for example, two-cylinder, engine E, and a transmission M (refer to FIG. 3) built in a crankcase 12. A countershaft 36 hereinafter described of the transmission M is connected to the rear wheel Wr through a chain power transmission apparatus 13 to drive the rear wheel Wr.

Meanwhile, a suspension apparatus S including a cushion unit 14 (refer to FIG. 2) for damping upward and downward rocking motion of the rear fork 8 is interposed between the pivot frame 5 and the rear fork 8.

An accommodation box 28 is mounted on the main frames 3, 3 above the engine E, and a riding seat 29 of the tandem type is attached for opening and closing movement on the seat rails 6, 6 rearwardly of the accommodation box 28. A fuel tank T is disposed below the riding seat 29.

Figure 3:
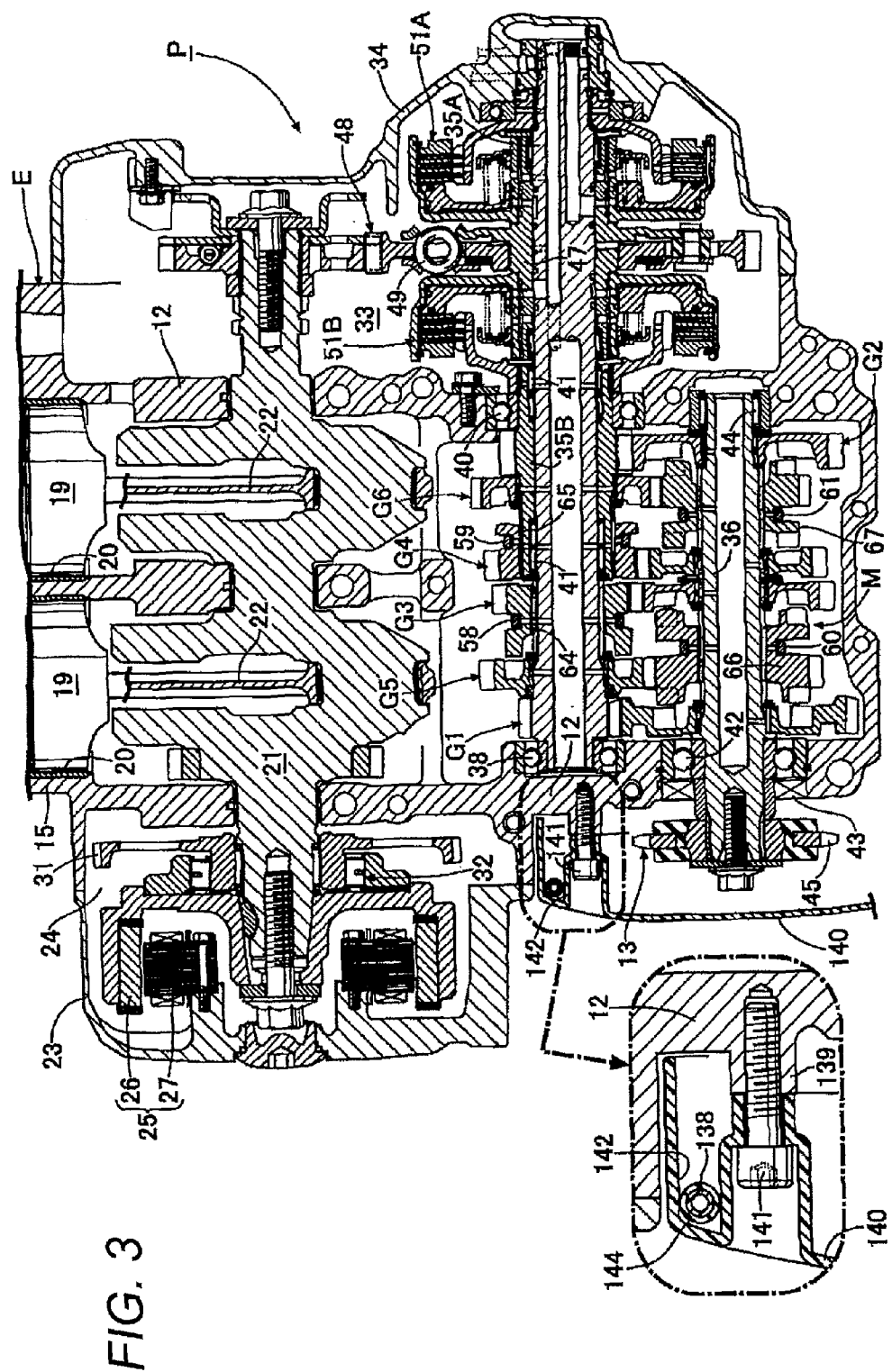
FIG. 3 is an enlarged sectional view taken along line 3-3 of FIG. 2.

Referring to FIGS. 2 and 3, an engine main body of the engine E includes the crankcase 12 for supporting a crankshaft 21, which has an axial line extending in a vehicle widthwise direction, for rotation, a cylinder block 15 coupled to an upper end of a front portion of the crankcase 12 such that it has a forwardly inclined cylinder axial line Y, a cylinder head 16 coupled to an upper end of the cylinder block 15, a head cover 17 coupled to an upper end of the cylinder head 16, and an oil pan 18 coupled to a lower portion of the crankcase 12.

The cylinder block 15 has a plurality of, for example, two cylinder bores 20, 20 (refer to FIG. 3) disposed in parallel to each other in the vehicle widthwise direction, and pistons 19, 19 are fitted for sliding movement in the cylinder bores 20, 20. The crankshaft 21 extending along the array direction of the cylinder bores 20, 20, that is, in the vehicle widthwise direction, is supported for rotation on the crankcase 12 and connected to the pistons 19, 19 through connecting rods 22, 22.

To a left side face of the crankcase 12, a generator cover 23 which configures part of the engine main body is coupled such that a generator chamber 24 is formed between the generator cover 23 and the crankcase 12. A rotor 26 of a generator 25 accommodated in the generator chamber 24 is secured to a left end portion of the crankshaft 21 extending into the generator chamber 24, and a stator 27 of the generator 25 is secured to the generator cover 23 such that it is surrounded by the rotor 26.

A starter motor 30 is attached to an upper portion of the crankcase 12 as shown in FIG. 2, and a ring gear wheel 31 which configures part of a speed reducing gear train for transmitting power from the starter motor 30 is connected to the rotor 26 through a one-way clutch 32. Accordingly, if the starter motor 30 is rendered operative, then the crankshaft 21 is cranked through the speed reducing gear train including the ring gear wheel 31, a one-way clutch 32 and the rotor 26 and the engine E can be started thereby.

To a right side face of the crankcase 12, a clutch cover 34 which cooperates with the crankcase 12 to define a clutch chamber 33 therebetween is coupled in such a manner as to configure part of the engine main body.

The transmission M accommodated in the crankcase 12 includes a plurality of gear trains of different gear stages, for example, first to sixth speed gear trains G1 to G6, provided for selective establishment between first and second main shafts 35A and 35B supported for rotation on the crankcase 12 and having axial lines parallel to the crankshaft 21 and the countershaft 36.

The first and second main shafts 35A and 35B are disposed coaxially with each other, and the first main shaft 35A which extends for rotation through the right side wall of the crankcase 12 is supported at a left end portion thereof on the left side wall of the crankcase 12 through a ball bearing 38. Further, the first main shaft 35A is supported at a right end portion thereof for rotation by the clutch cover 34. Meanwhile, the second main shaft 35B coaxially surrounds the first main shaft 35A and extends for rotation through the right side wall of the crankcase 12, and a ball bearing 40 is interposed between the right side wall of the crankcase 12 and the second main shaft 35B. A plurality of needle bearings 41, 41 are interposed between the first and second main shafts 35A and 35B.

The countershaft 36 projects at a left end portion thereof from a rear portion of the left side wall of the crankcase 12 such that a ball bearing 42 and an annular seal member 43 are interposed between the left end portion of the countershaft 36 and the left side wall of the crankcase 12. Meanwhile, the countershaft 36 is supported at a right end portion thereof for rotation on the right side wall of the crankcase 12 through a needle bearing 44.

Between the first main shaft 35A and the countershaft 36, the first speed gear train G1, third speed gear train G3 and fifth speed gear train G5 which are odd-numbered gear trains are provided, and between the second main shaft 35B and the countershaft 36, the second speed gear train G2, fourth speed gear train G4 and sixth speed gear train G6 which are even-numbered gear trains are provided.

A driving sprocket wheel 45 of the chain power transmission apparatus 13 is fixed to the left end portion of the countershaft 36 which projects from the left side wall of the crankcase 12.

A power transmitting cylindrical shaft 47 positioned adjacent the second main shaft 35B in the axial direction is mounted for relative rotation at a fixed position in the axial direction at an intermediate portion of the first main shaft 35A rather near to the right end. Power from the crankshaft 21 is transmitted to the power transmitting cylindrical shaft through a primary power transmitting apparatus 48 and a torque damper 49.

In the clutch chamber 33, a first clutch 51A interposed between the power transmitting cylindrical shaft 47 and the first main shaft 35A and a second clutch 51B interposed between the power transmitting cylindrical shaft 47 and the second main shaft 35B are accommodated.

Both of the first clutch 51A and the second clutch 51B are configured as clutches of the hydraulic multiple disk type and exhibit an on state by spring force when no hydraulic pressure is applied to a hydraulic chamber but exhibit an off state when a hydraulic pressure is supplied to the hydraulic chamber. When the first clutch 51A is in an on state, power transmission between the power transmitting cylindrical shaft and the first main shaft 35A is permitted, but when the second clutch 51B is in an on state, power transmission between the power transmitting cylindrical shaft 47 and the second main shaft 35B is permitted. Supply and cutoff of supply of the hydraulic pressure to the hydraulic chambers of the first and second clutches 51A and 51B are controlled by a clutch controlling device not shown.

As shown in FIG. 2, in the crankcase 12, the first and second main shafts 35A and 35B are disposed at an upper position between the crankshaft 21 and the countershaft 36 disposed rearwardly of the crankshaft 21, and a shift mechanism 52 for carrying out changeover control of the transmission M is disposed at a lower position between the crankshaft 21 and the countershaft 36.

Figure 4:
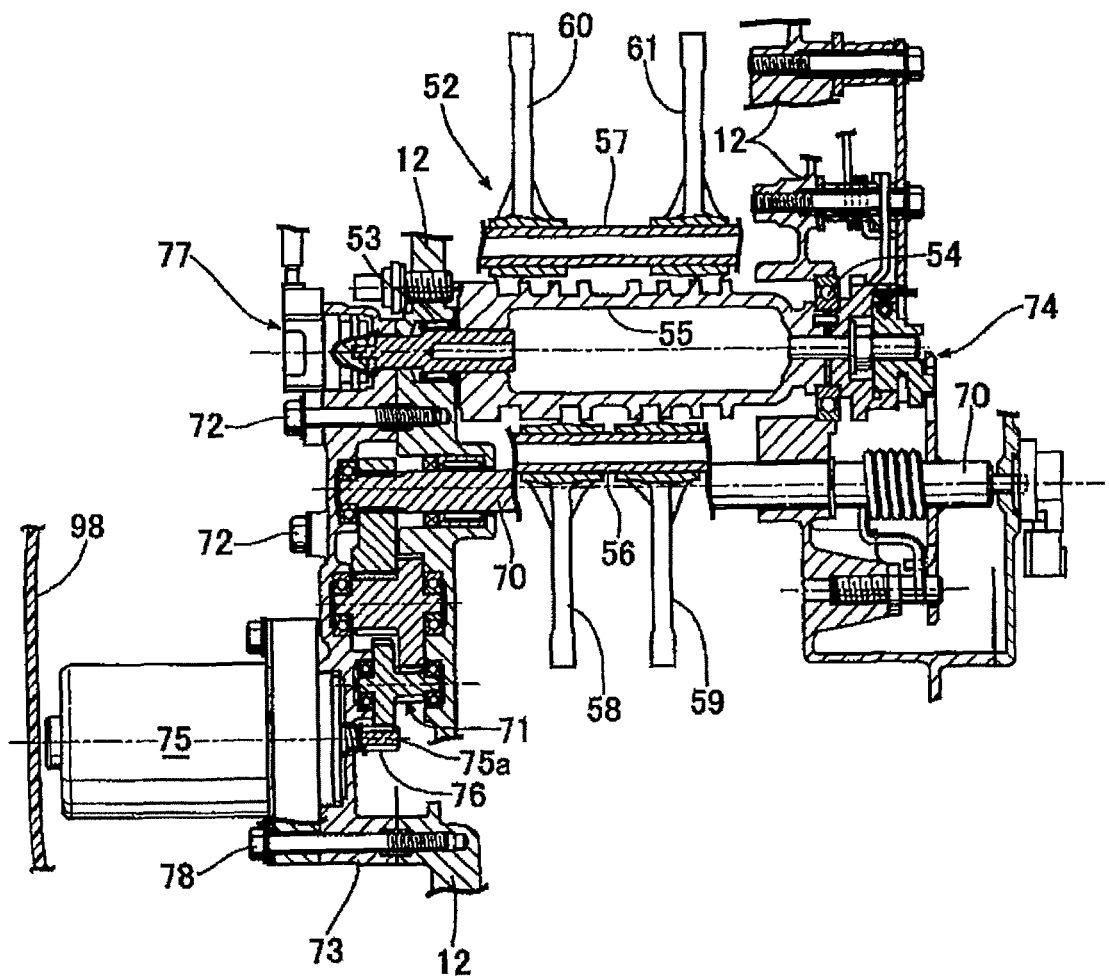
FIG. 4 is an enlarged sectional view taken along line 4-4 of FIG. 2.
Figure 5:
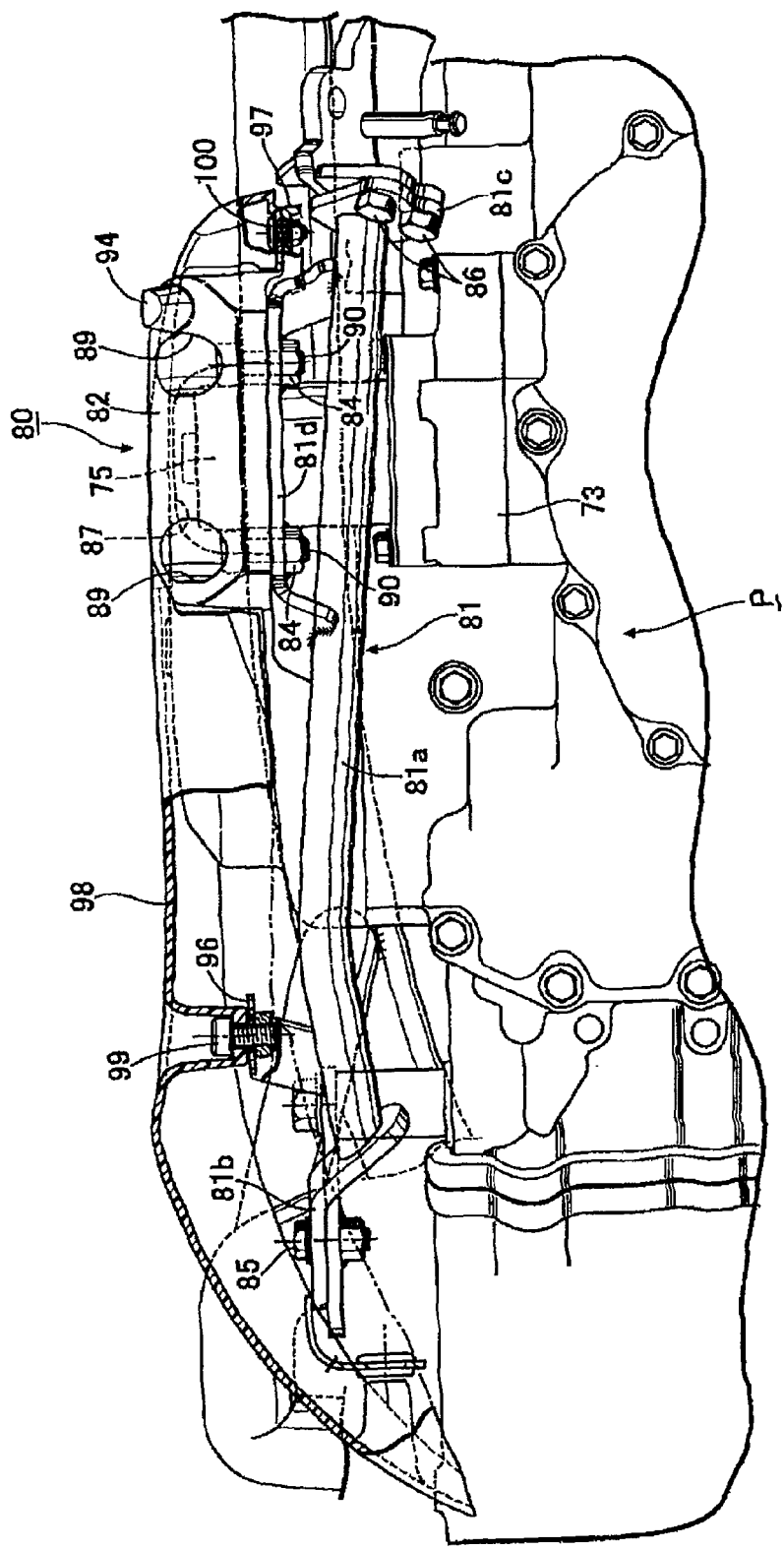
FIG. 5 is a view (partly in section) as viewed in a direction indicated by arrow mark 5 in FIG. 2.

Referring to FIG. 4, this shift mechanism 52 includes a shift drum 55 supported in parallel to the first and second main shafts 35A and 35B and the countershaft 36 on the crankcase 12 through a needle bearing 53 and a ball bearing 54, first and second fork shafts 56 and 57 supported in parallel to the shift drum 55 on the crankcase 12, first and second shift forks 58 and 59 supported for sliding movement on the first fork shaft 56 and engageable with predetermined cam grooves of the shift drum 55, and third and fourth shift forks 60 and 61 supported for sliding movement on the second fork shaft 57 and engageable with predetermined cam grooves of the shift drum 55. The first shift fork 58 engages at a fork portion thereof with a first shift gear wheel 64 on the first main shaft 35A and the second shift fork 59 engages at a fork portion thereof with a second shift gear wheel 65 on the second main shaft 35B while the third and fourth shift forks 60 and 61 engage at a fork portion thereof with third and fourth shift gear wheels 66 and 67 on the countershaft 36, respectively, such that, by rotation of the shift drum 55, the first to fourth shift gear wheels 64 to 67 are selectively shifted through the first to fourth shift forks 58 to 61 so that connection of the first to sixth speed gear trains G1 to G6 is selectively established. Thereupon, the first clutch 51A participates in power transmission by the speed change gear trains G1, G3 and G5 at the odd-numbered states while the second clutch 51B participates in power transmission by the speed change gear trains G2, G4 and G6 at the even-numbered stages.

Further, the shift mechanism 52 includes a shift spindle 70 supported for rotation on the left and right side walls of the crankcase 12 and juxtaposed in parallel adjacent the shift drum 55, a fixed angle feeding mechanism 74 for connecting a right end portion of the shift spindle 70 to a right end portion of the shift drum 55, and a speed reducing gear train 71 for connecting to a left end portion of the shift spindle 70. This speed reducing gear train 71 is accommodated between and held by the left side wall of the crankcase 12 and a gear case 73 jointed to an outer side face of the crankcase 12 by means of a bolt 72.

A shift actuator 75 is attached to the outer side face of the gear case 73 by means of a long bolt 78 screwed in the crankcase 12 through the gear case 73. In other words, the shift actuator 75 is fixed to the crankcase 12 together with the gear case 73 by the long bolt 78. This shift actuator 75 is configured from an electric motor, and a pinion gear wheel 76 which serves as an input member to the speed reducing gear train 71 is formed at an end portion of an output shaft 75a of the shift actuator 75 which extends into the gear case 73.

Thus, every time the shift actuator 75 is rotated by a predetermined angle, the shift drum 55 rotates by the predetermined angle to actuate the first to fourth shift forks to 61 through the speed reducing gear train 71, shift spindle 70 and fixed angle feeding mechanism 74 so that desired speed change can be obtained.

It is to be noted that a shift position sensor 77 for detecting a rotational angle of the shift drum 55 is connected to a left end portion of the shift drum 55.

Referring to FIGS. 2 and 5 to 8, actuator guard means 80 is provided on the vehicle body frame F in order to protect the shift actuator 75 from an obstacle. This actuator guard means 80 is configured from a guard frame 81 extending in the forward and backward direction just below the shift actuator 75 and connected to the vehicle body frame F, and a guard member 82 fixed to the guard frame 81 and formed in such a manner as to cover a lower face and an outer side face of the shift actuator 75.

The guard frame 81 is configured from a frame main body 81a formed from a pipe member, a front connecting plate 81b welded to a front end of the frame main body 81a, a rear connecting plate 81c welded to a rear end of the frame main body 81a, and an attachment plate 81d welded to an outer side face of the frame main body 81a at an intermediate portion displaced a little to the rear end. A pair of front and rear bolt holes 83, 83 are perforated in the attachment plate 81d, and a pair of welding nuts 84, 84 corresponding to the bolt holes 83, 83 are securely mounted on an inner side face of the attachment plate 81d. The front connecting plate 81b is removably fixed to a lower end portion of the down frames 4 by a bolt 85 while the rear connecting plate 81c is removably attached to a lower end portion of the pivot frame 5 by a bolt 86.

Figure 6:
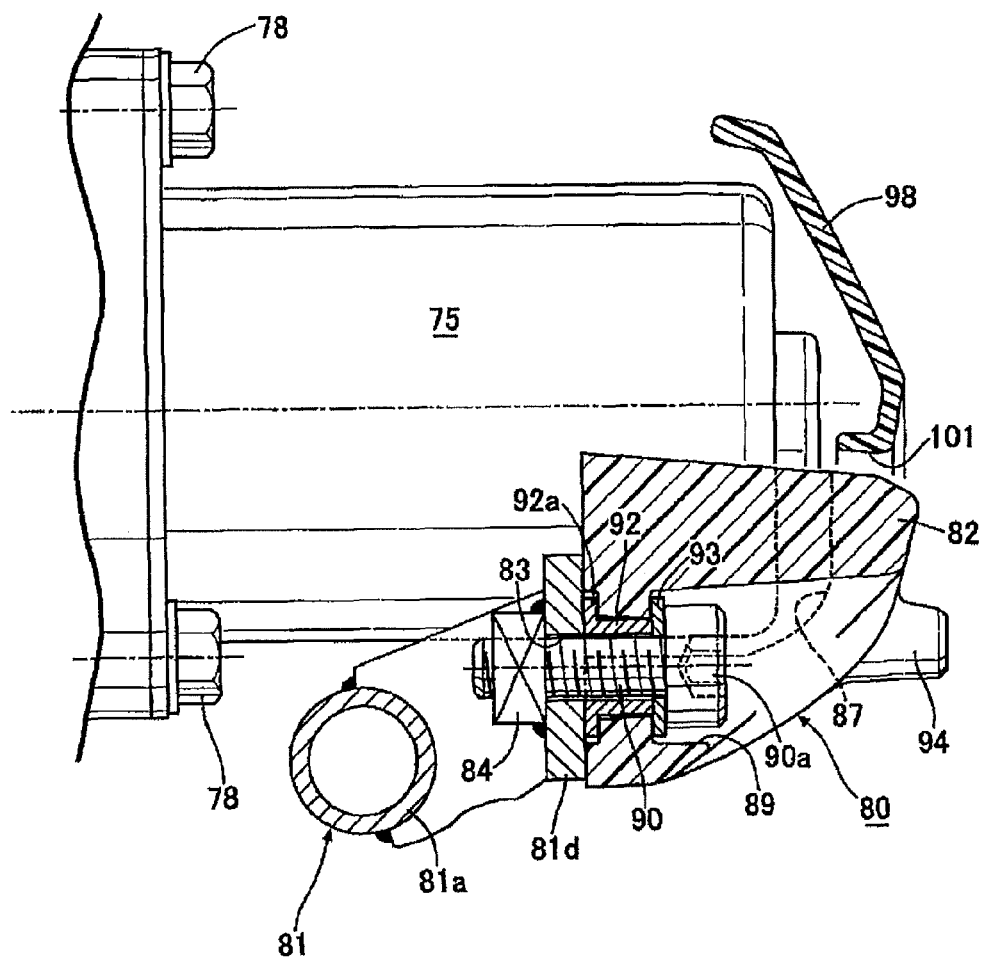
FIG. 6 is an enlarged sectional view taken along line 6-6 of FIG. 2.
Figure 7:
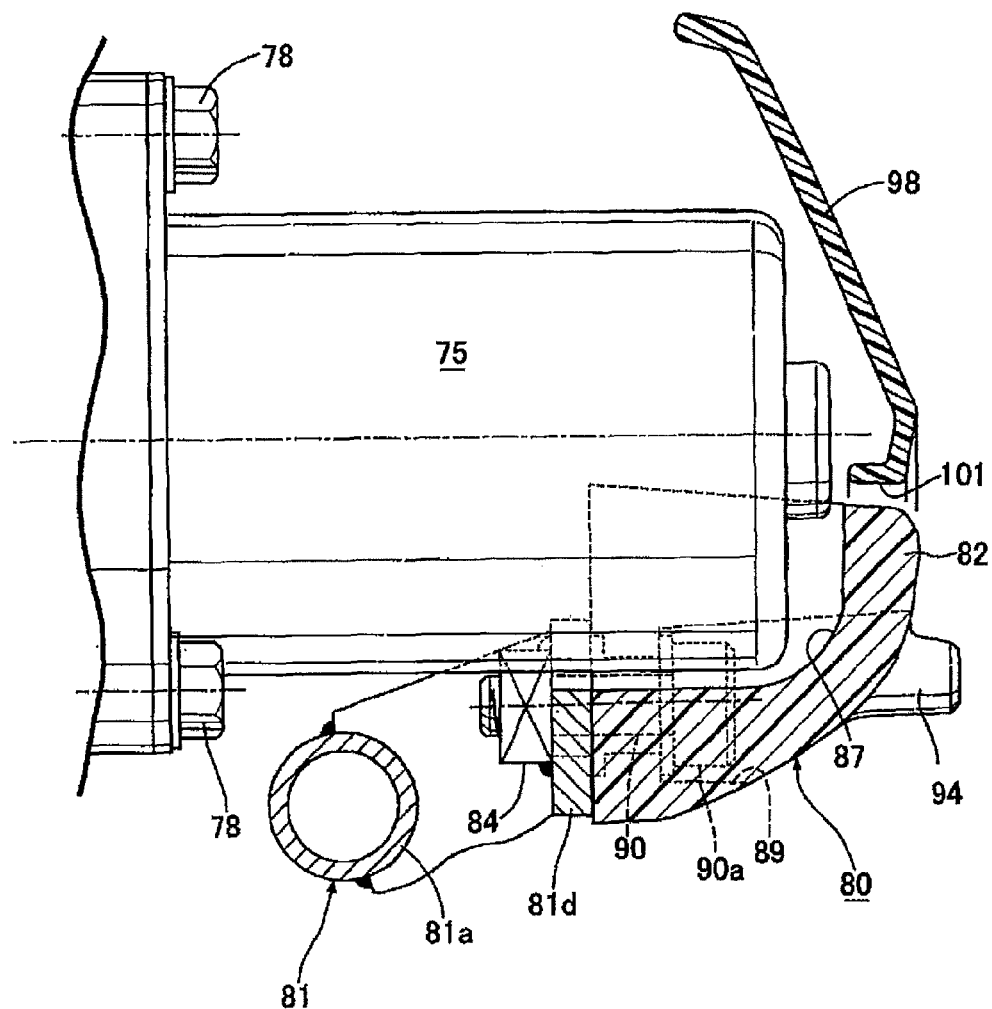
FIG. 7 is an enlarged sectional view taken along line 7-7 of FIG. 2.
Figure 8:
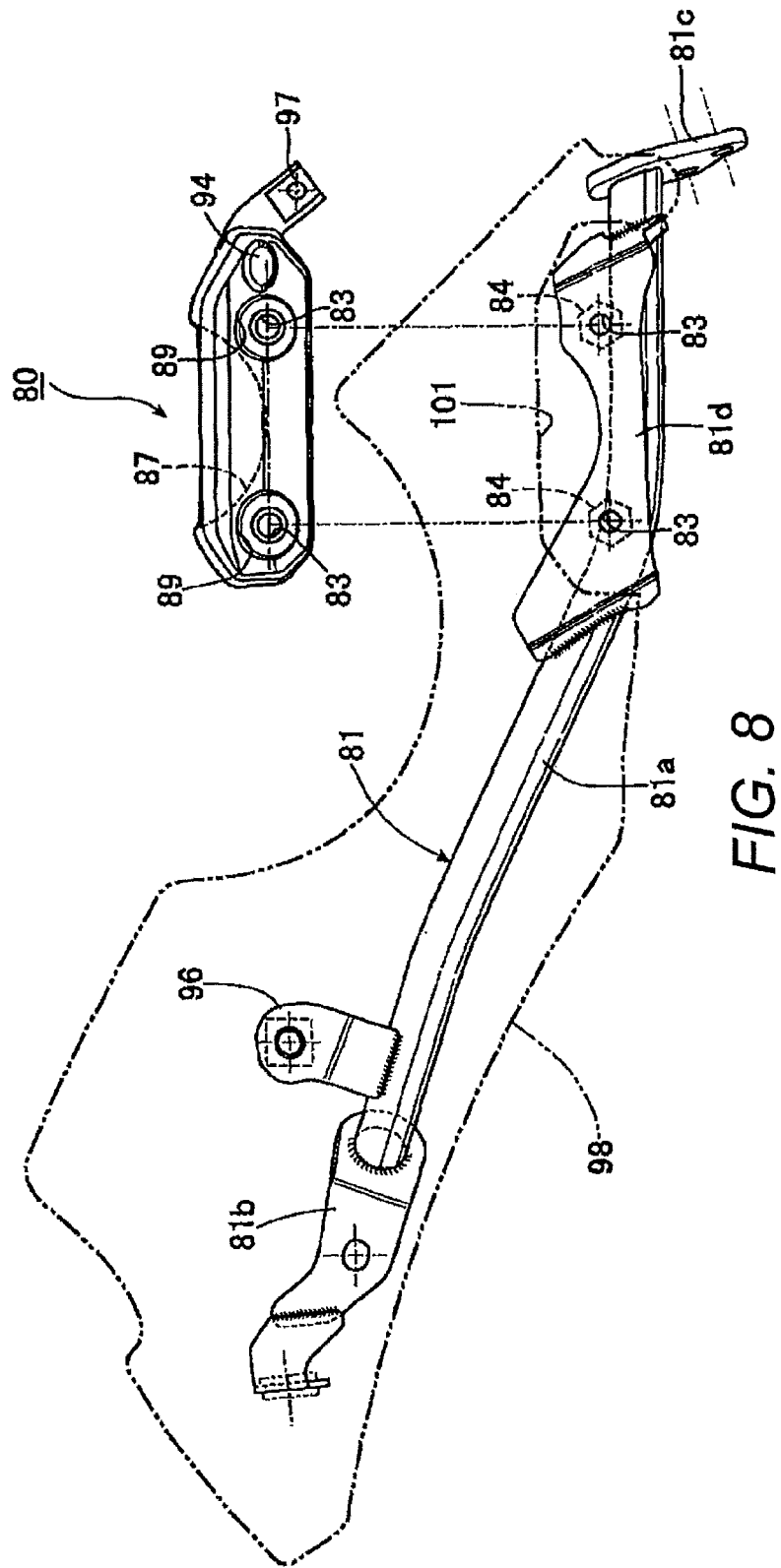
FIG. 8 is an exploded side elevational view of actuator guard means shown in FIG. 2.

The guard member 82 is attached to the attachment plate 81d in the following manner. In particular, the guard member 82 is made of fiber-reinforced synthetic resin, and a recessed portion 87 open to an upper face thereof is formed on an inner side face of the guard member 82 as shown in FIGS. 6 to 8. A pair of attachment holes 88, 88 are provided at the opposite front and rear end portions of the guard member 82 across the recessed portion 87, and a pair of recessed holes 89, 89 of a large diameter to which outer ends of the attachment holes 88, 88 are open are provided across the recessed portion 87. The guard member 82 is joined to the outer side face of the attachment plate 81d by screwing and fastening an attachment bolt 90, which has a head portion 90a accommodated in each recessed hole 89, into and through a welding nut 84 described hereinabove. Thereupon, a reinforcing ring 92 with a flange 92a fitted on the attachment bolt 90 is mounted in each attachment hole 88, and a washer 93 is interposed between the bottom face of the recessed hole 89 and the head portion 90a of the attachment bolt 90.

By accommodating a lower portion of the shift actuator 75 into the recessed portion 87 of the guard member attached to the attachment plate 81d in this manner, the lower face and the outer side face of the shift actuator 75 are covered with the guard member 82 (refer to FIG. 7). Further, on the outer side face of the guard member 82, a grounding projection 94 is formed which is brought into contact, when the motorcycle falls sideways, first from within the actuator guard means 80, that is, earlier than a left side cover 98, with the ground.

A front attachment portion 96 is provided on the front connecting plate 81b while a rear attachment portion 97 projecting rearwardly from a rear end of the guard member 82 is provided on the guard member 82. The guard frame 81 and the left side cover 98 which covers the outer side face of the shift actuator 75 exposed upwardly from the guard member 82 are removably fixed to the front attachment portion 96 and the rear attachment portion 97 by bolts 99 and 100, respectively. A cutaway 101 through which the guard member 82 is exposed is provided at a lower side edge of the left side cover 98.

It is to be noted that, in FIGS. 1 and 2, reference character G denotes the center of gravity of the motorcycle.

Thus, since the shift mechanism 52 provided in a lower portion of the power unit P is attached to a lower portion of a side face of the power unit P, the connection structure between the shift mechanism 52 and the shift actuator 75 is simplified, and upon operation of the shift actuator 75, the responsibility of the shift mechanism 52 is enhanced and speed change can be carried out rapidly.

Besides, since the actuator guard means 80 for protecting the shift actuator 75 attached to the lower portion of the side face of the power unit P from an obstacle is configured from the guard frame 81 extending in the forward and backward direction just below the shift actuator 75 and connected to the vehicle body frame F and the guard member 82 connected to the guard frame 81 and formed so as to cover the lower face and the outer side face of the shift actuator 75, when the motorcycle falls sideways, contact of the shift actuator 75 with the road surface can be prevented by the guard member 82 and the guard member 82 can be supported firmly by the guard frame 81. Further, since the shift actuator 75 is covered at the lower face thereof with both of the guard member 82 and the guard frame 81, during traveling of the motorcycle, the shift actuator 75 can be protected from a projection on the road surface or a flying stone by the guard member 82 and the guard frame 81.

Besides, since the guard frame 81 extends in the forward and backward direction just below the shift actuator 75 and is connected to the vehicle body frame F and hence is less likely to appear on the outer appearance of the motorcycle, it does not impair the outer appearance of the motorcycle. In this manner, both of protection of the shift actuator 75 and enhancement of the outer appearance of the motorcycle can be achieved.

Particularly, since the guard member 82 has, on the inner side face thereof, the recessed portion 87 open to the upper face such that a lower portion of the shift actuator 75 is accommodated in the recessed portion 87 to cover the lower face and the outer side face of the shift actuator 75, the lower face and the outer side face of the shift actuator 75 can be covered with the single guard member 82, and simplification in structure can be anticipated. Accordingly, it is easy to form the guard member 82 from synthetic resin and provide the guard member 82 at a low price. Besides, since the guard member 82 is removably fixed to the guard frame 81, even where the guard member 82 is damaged by contact with an obstacle, repair can be carried out only by removing only the guard member 82 from the guard frame 81 and replacing the guard member 82 with a new part. Consequently, the repair cost can be suppressed low.

Meanwhile, since the guard frame 81 is fixed at the opposite front and rear end portions thereof to lower end portions of the down frame 4 and the pivot frame 5 which configure the vehicle body frame F, the supporting strength of the guard frame 81 is reinforced by the down frame 4 and the pivot frame 5. Consequently, not only it is possible to raise the protection function for the shift actuator 75 but also the guard frame 81 cooperates with the head pipe 2, main frame 3, down frame 4 and pivot frame 5 to configure a loop-like frame structure, which can contribute to increase in rigidity of the vehicle body frame F.

Further, since the left side cover 98 which covers the guard frame 81 in a state in which the outer side face of the guard member 82 is exposed is attached to the front attachment portion 96 and the rear attachment portion 97 provided on the guard frame 81 and the guard member 82, respectively, the sideward outer appearance of the power unit P can be further enhanced and an obstacle approaching from outwardly sidewardly can be received by the guard member 82 thereby to prevent damage to the left side cover 98.

When the motorcycle falls sideways to the shift actuator 75 side, that is, to the left, the grounding projection 94 provided in a projecting manner on the outer side face of the guard member 82 is brought into contact first from within the actuator guard means 80 with the ground, and consequently, it is facilitated to control the leftwardly falling posture of the motorcycle. Further, since the grounding projection 94 thereupon is brought into contact with the ground earlier than the left side cover 98, it plays a role of moderating the ground contacting impact of the left side cover 98 and damage to the left side cover 98 can be reduced.

Figure 9:
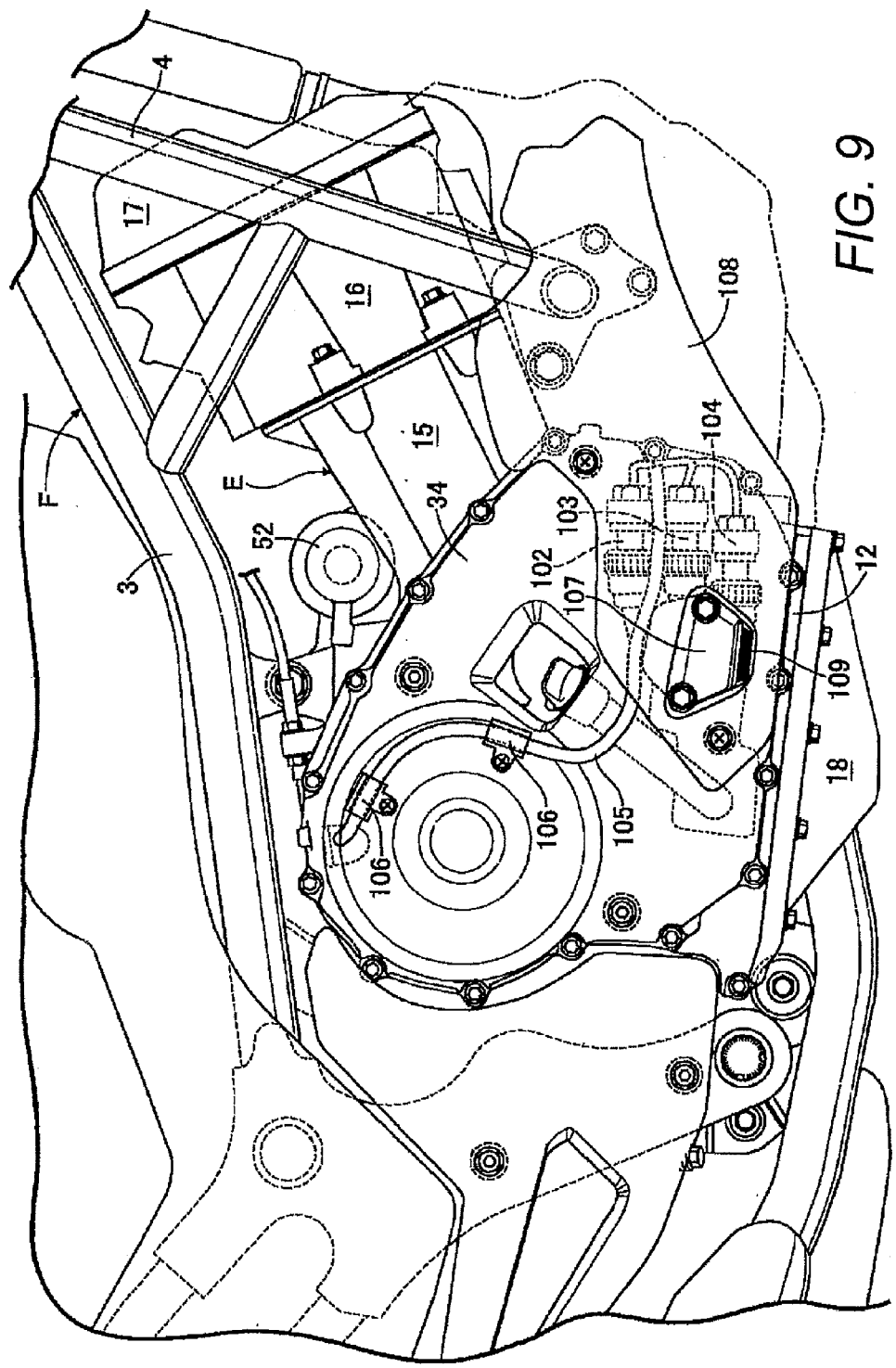
FIG. 9 is a right side elevational view around a power unit in FIG. 2.

Referring now to FIG. 9, a first hydraulic pressure sensor 102 for the first clutch 51A, a second hydraulic pressure sensor 103 for the first clutch 51A and a third hydraulic pressure sensor 104 for an oil filter not shown are provided for the clutch cover 34 joined to the right side face of the crankcase 12. A signal harness 105 extending from the first to third hydraulic pressure sensors 102 to 104 to a clutch controlling apparatus not shown is held on the clutch cover 34 by a plurality of clips 106, 106.

Further, a maintenance lid 107 for closing up a maintenance window for an auxiliary apparatus such as an oil filter, which is open to the clutch cover 34, is joined to the clutch cover 34, and a right side cover 108 which covers the first to third hydraulic pressure sensors 102 to 104 and the root of the signal harness 105 connected to the first to third hydraulic pressure sensors 102 to 104 in a state in which the maintenance lid 107 is exposed is attached to the clutch cover 34 and the vehicle body frame F. Accordingly, contact of the first to third hydraulic pressure sensors 102 to 104 and the signal harness 105 with a foot of the rider or an obstacle is prevented by the right side cover 108.

A grounding projection 109 which is brought into contact with the ground when the motorcycle falls sideways to the right side is formed on the outer side face of the maintenance lid 107 exposed from the right side cover 108. Accordingly, when the motorcycle falls sideways to the right side, the grounding projection 109 is brought into contact with the ground, and consequently, damage to the right side cover 108 can be prevented and the sideways falling posture to the right side of the motorcycle can be controlled.

Figure 10:
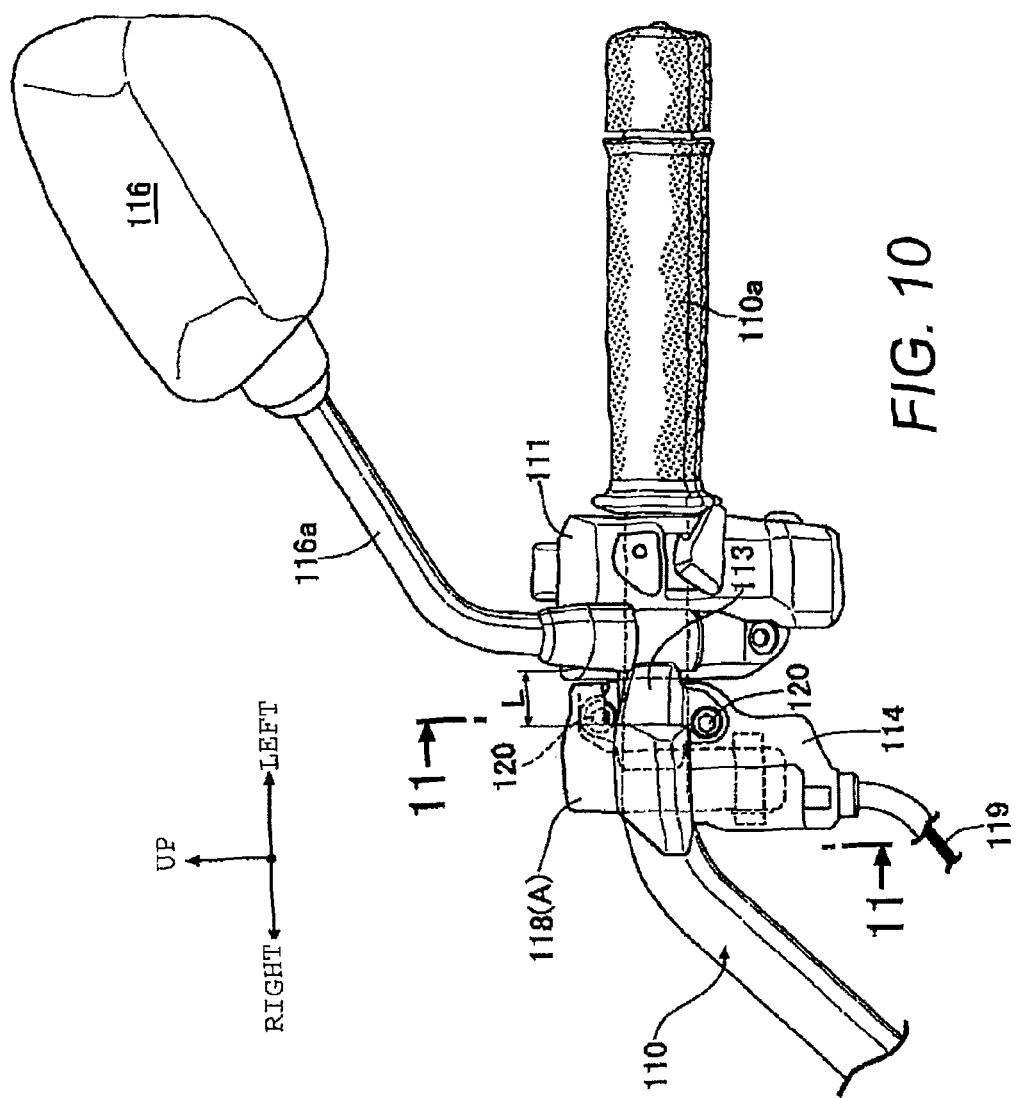
FIG. 10 is an enlarged view indicated by an arrow mark 10 in FIG. 1.
Figure 11:
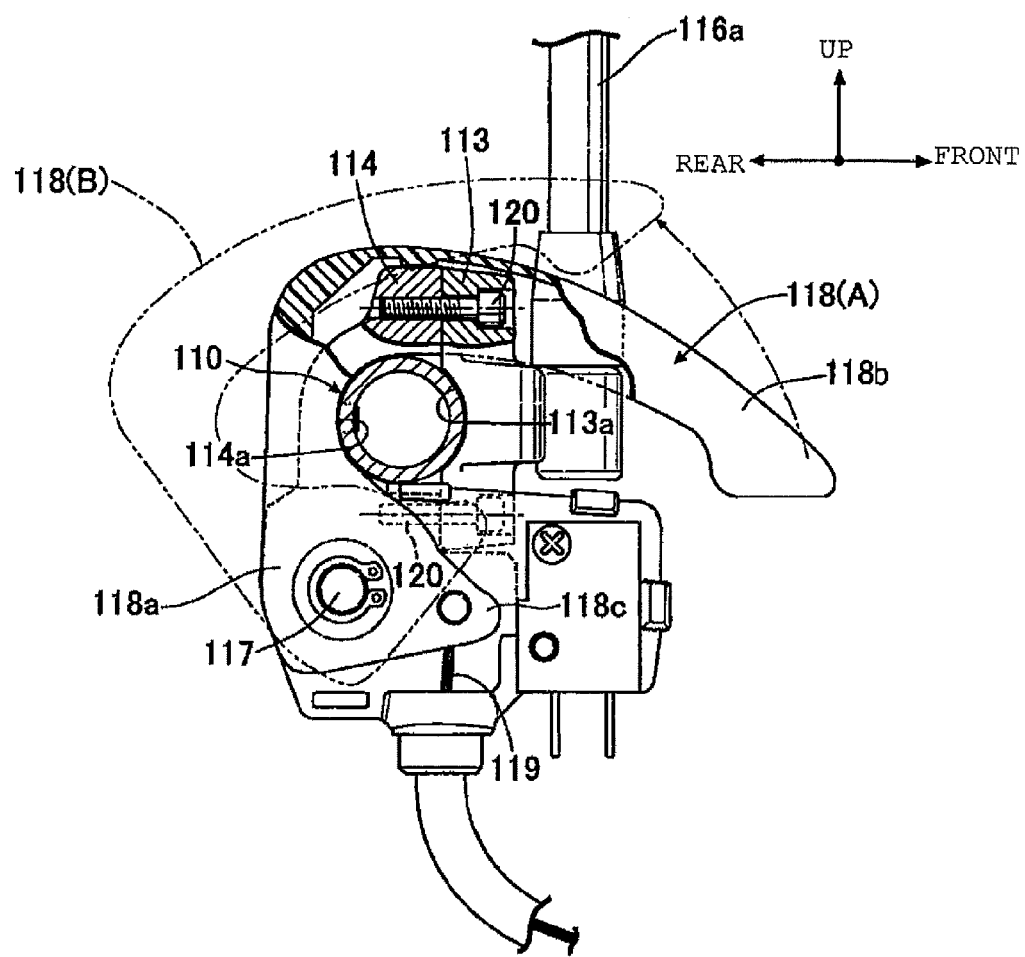
FIG. 11 is a sectional view taken along line 11-11 of FIG. 10.

Referring now to FIGS. 10 and 11, on a steering handle bar 110 fixed to an upper end of the front fork 1, a switch case 111 which supports various switches is attached adjacent the inner end of a left side grip 110a. Further, a mirror holder 113 and a parking lever holder 114 adjacent the inner end of the switch case 111 are attached such that they sandwich the steering handle bar 110 therebetween from forwardly and backwardly.

In particular, the mirror holder 113 and the parking lever holder 114 are connected to each other by a pair of upper and lower bolts 120, 120 such that arcuate faces 113a and 114a provided in a concave manner on opposing faces of the mirror holder 113 and the parking lever holder 114 are pressed against an outer circumferential face of the steering handle bar 110. Thereupon, the mirror holder 113 is disposed on the front side of the steering handle bar 110 while the parking lever holder 114 is disposed on the rear side of the steering handle bar 110. A mirror stay 116a which supports, at an upper end thereof, a back mirror 116 is secured at a lower end portion thereof to the mirror holder 113. A support shaft 117 positioned below the steering handle bar 110 is provided on the parking lever holder 114, and a parking lever 118 is supported by the support shaft 117. The parking lever 118 includes an operation arm 118b extends upwardly from a base end portion 118a supported by the support shaft 117 and further extending rearwardly in a curved state bypassing the front side of the steering handle bar 110, and an actuation arm 118c extending rearwardly from the base end portion 118a. A parking wire 119 connected to an end of the actuation arm 118c is connected to an actuating portion of a parking blade not shown such that the parking blade can be operated by pivoting the operation arm 118b from a rearwardly directed non-actuated position A to an upwardly directed actuated position B. A gap L for preventing interference of a finger of the rider who operates the operation arm 118b with the mirror stay 116a is provided between the operation arm 118b and the mirror stay 116a.

Figure 12:
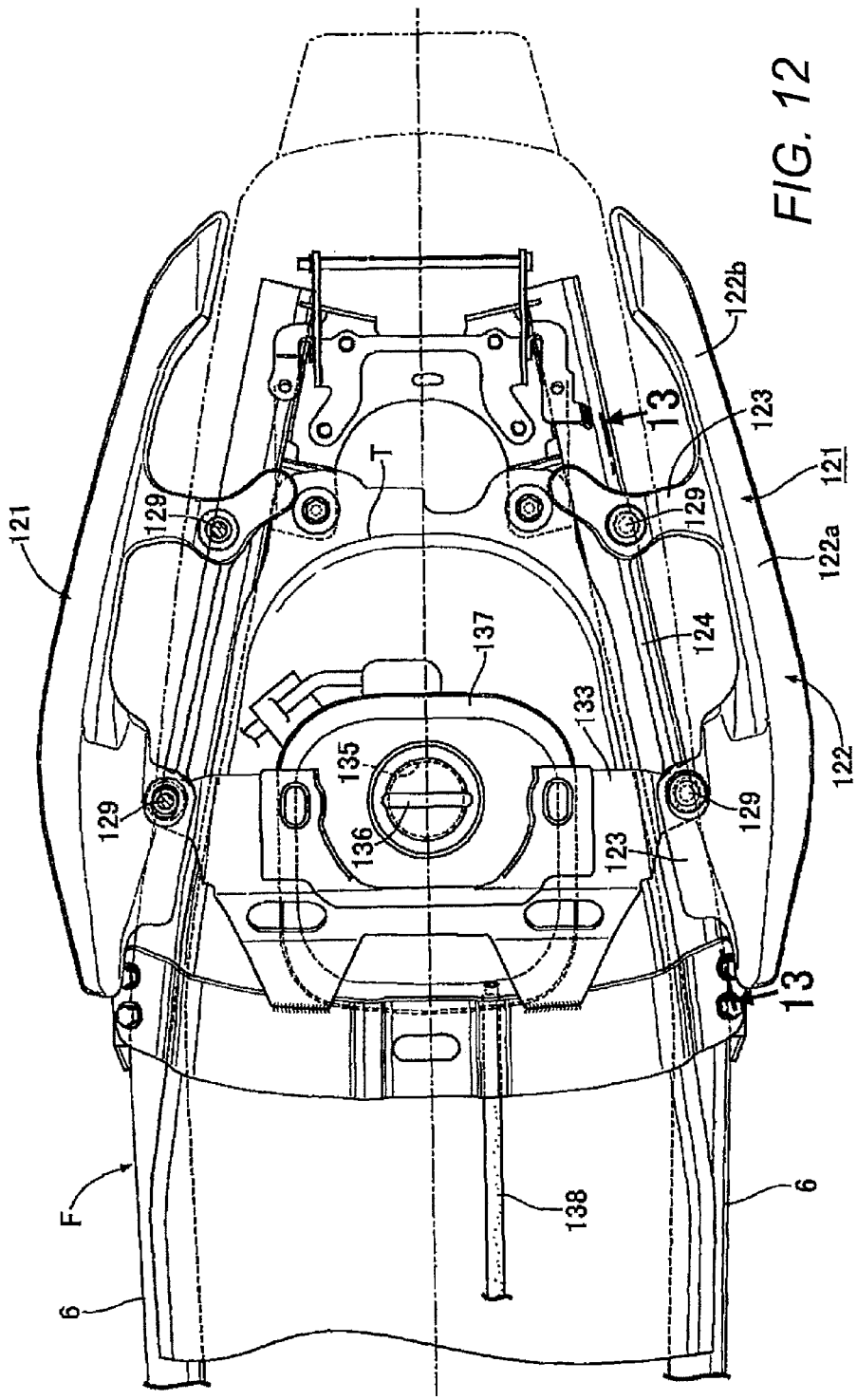
FIG. 12 is a view as indicated by an arrow mark 12 in FIG. 1 showing the motorcycle in a state in which a seat is removed.
Figure 13:
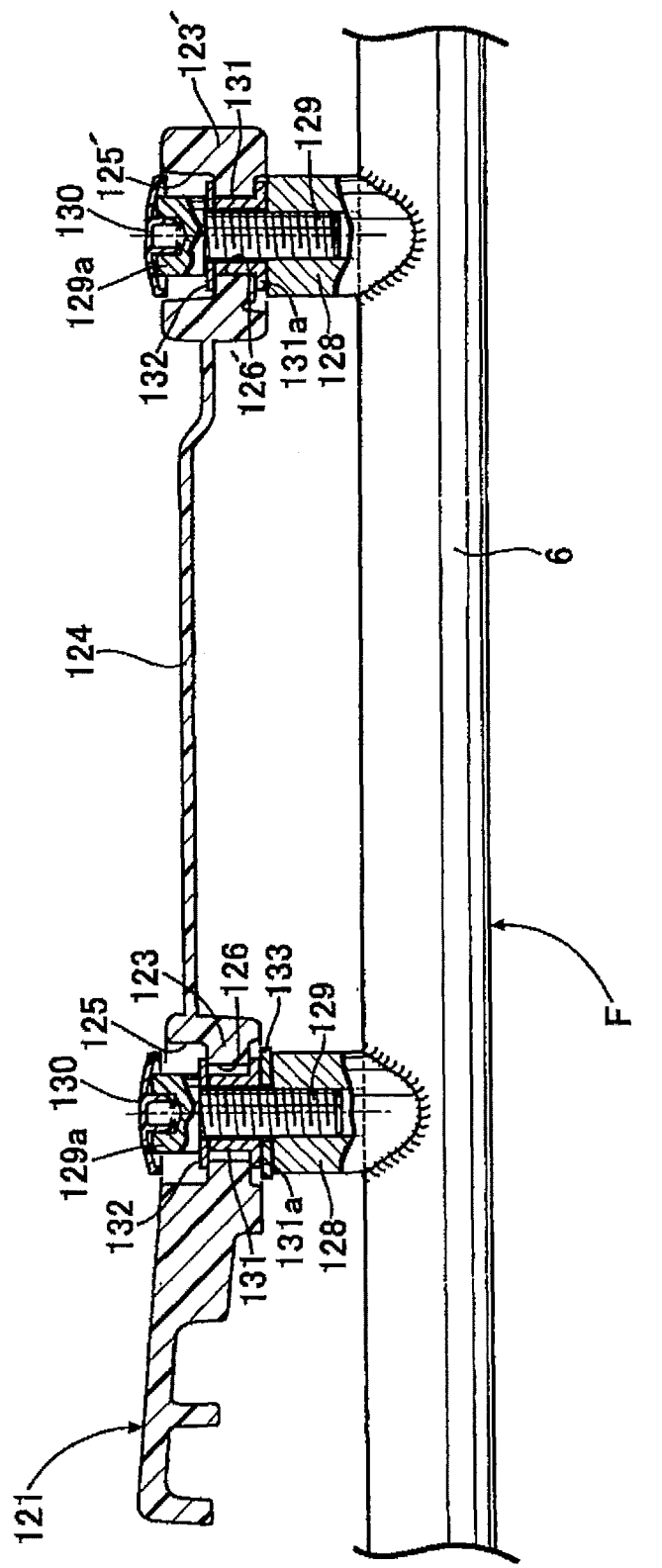
FIG. 13 is a sectional view taken along line 13-13 of FIG. 12.

Referring now to FIGS. 1, 12 and 13, grab rails 121, 121 symmetrical leftwardly and rightwardly are attached in the following manner to rear portions of the left and right seat rails 6, 6.

Each grab rail 121 is made of synthetic resin and is configured from a grab rail main body 122 extending in the forward and rearward direction, a pair of attachment portions 123 and 123' projecting from the grab rail main body 122 toward the vehicle body side with a pair of front and rear grip portions 122a and 122b left on the grab rail main body 122, and a bar-like connecting portion 124 for integrally connecting end portions of the attachment portions 123 and 123'. In the attachment portions 123 and 123', recessed holes 125 and 125' open to the upper face of the attachment portions 123 and 123' and attachment holes 126 and 126' open to the bottom face of the recessed holes 125 and 125' are provided, and the front side attachment hole 126 is formed as an elongated hole having a major axis in the forward and backward direction.

Meanwhile, a pair of welding nuts 128, 128 are fixed at positions of an upper face of each seat rail 6 corresponding to the paired attachment holes 126 and 126'. The grab rail 121 is fixed to the seat rail 6 by screwing and tightening bolts 129, 129 fitted in the attachment holes 126 and 126' into and to the welding nuts 128, 128.

Thereupon, the head portion 129a of each bolt 129 is accommodated in the recessed hole 125 or 125', and a vanity cap 130 is mounted on the head portion 129a. Further, a reinforcing collar 131 having a flange 131a at a lower end thereof and inserted by each bolt 129 therethrough is fitted in each of the attachment holes 126 and 126', and a washer 132 is interposed between an upper end of the reinforcing collar 131 and the bottom face of the recessed hole 125 or 125' and the head portion 129a of the bolt 129. In the front side attachment hole 126 (elongated hole), the reinforcing collar 131 can slidably move together with a bolt fitted in the reinforcing collar 131 along a major axis direction of the attachment hole 126. Consequently, a dimensional error between the distance between the two welding nuts 128, 128 on the seat rail 6 and the distance between the attachment holes 126 and 126' of the grab rail 121 is absorbed. Further, between the front side welding nut 128 and the flange 131a of the reinforcing collar 131 corresponding to the welding nut 128, an end portion of a cross member 133 which connects the left and right seat rails 6, 6 to each other is interposed. In particular, the front side attachment portion 123 of the grab rail 121 and the cross member 133 are fastened together to the welding nut 128 by the bolt 129, and consequently, simplification of the attachment structure of the grab rail 121 and the cross member 133 can be anticipated.

Referring now to FIG. 12, an oil filler 135 which is normally closed up with a tank cap 136 is provided on an upper wall of the fuel tank T in such a manner as to be sandwiched between the pair of left and right seat rails 6, 6 as viewed in plan. A fuel receiving pan 137 for receiving fuel leaking out from the oil filler 135 upon refueling is provided on the upper face of the fuel tank T in such a manner as to surround the oil filler 135. A drain tube 138 for guiding and draining fuel received by the fuel receiving pan 137 to the road surface is connected to a peripheral wall of the fuel receiving pan 137.

Meanwhile, as shown in FIGS. 2 and 3, a bow-shaped enclosure wall 139 which surrounds a front side half circumference of the outer circumference of the driving sprocket wheel 45 is formed on the left side face of the crankcase 12, and a sprocket wheel cover 140 made of synthetic resin for covering the front side outer circumferential face and outer side face of the driving sprocket wheel 45 is fixed to the outer side face of the enclosure wall 139 and the crankcase 12 by means of a plurality of bolts 141, 141.

The drain tube 138 is piped along an outer peripheral face of the bow-shaped enclosure wall 139, and a portion of the drain tube 138 which passes the upper side of the enclosure wall 139 is held in the following manner by the sprocket wheel cover 140.

Figure 14:
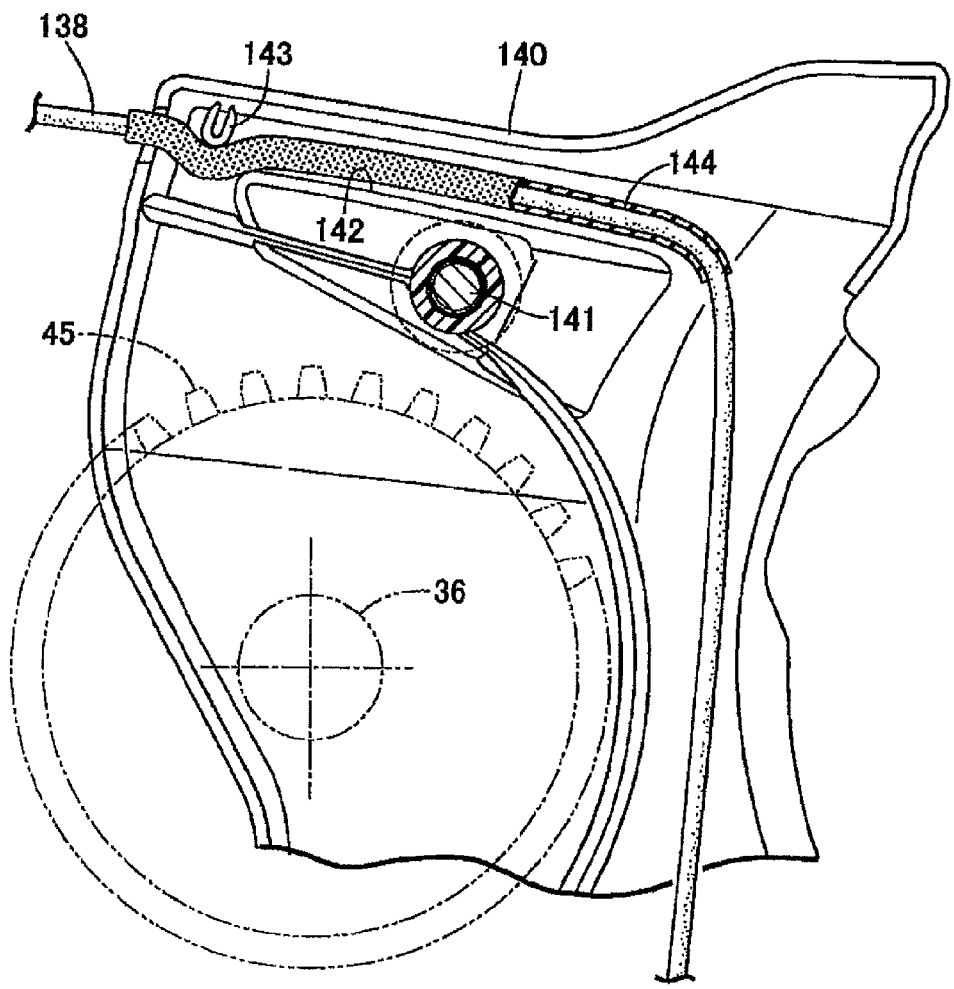
FIG. 14 is a rear elevational view of a sprocket wheel cover shown in FIGS. 2 and 3.

In particular, as shown in FIG. 14, on the rear face of the sprocket wheel cover 140, a tube guide groove 142 for guiding the drain tube 138 so as to be directed a little downwardly toward the downstream side and a rib 143 for pressing and holding one side face of the drain tube 138 in the tube guide groove 142 to suppress inadvertent movement of the drain tube 138 are formed. A portion of the drain tube 138 which contacts with the sprocket wheel cover 140 is covered with an abrasion resistant protective tube 144. By this, an intermediate portion of the drain tube 138 can be covered and besides guided and held by the sprocket wheel cover 140 in this manner, and consequently, simplification of the guiding and holding structure of the drain tube 138 can be anticipated while enhancing the outer appearance.

While the embodiment of the present invention is described above, the present invention is not limited to the embodiment described above, but allows various design changes without departing from the subject matter of the present invention. For example, it is possible to form the guard member 82 by die-casting of AL alloy. In this instance, the reinforcing ring 92 with the flange 92a can be omitted.

According to the embodiment, a saddle riding vehicle which includes a vehicle body frame and a power unit supported between a front wheel and a rear wheel by the vehicle body frame and having a transmission and a shift mechanism for the transmission provided therein and wherein a shift actuator for actuating the shift mechanism is attached to a lower portion of a side face of the power unit, has a first aspect that actuator guard means for protecting the shift actuator from an obstacle is configured from a guard frame extending in a forward and backward direction just below the shift actuator and connected to the vehicle body frame, and a guard member connected to the guard frame and formed in such a manner as to cover a lower face and an outer side face of the shift actuator.

According to the first aspect of the embodiment, the actuator guard means for protecting the shift actuator from an obstacle is configured from the guard frame extending in the forward and backward direction just below the shift actuator and connected to the vehicle body frame, and the guard member connected to the guard frame and formed in such a manner as to cover the lower face and the outer side face of the shift actuator. Therefore, when the vehicle falls sideways, contact of the shift actuator with the road surface can be prevented by the guard member, and besides the guard member can be supported firmly by the guard frame. Further, since the shift actuator is covered at the lower face thereof by both of the guard member and the guard frame, during traveling of the vehicle, the shift actuator can be protected from a projection on the road surface or from a flying stone by the guard member and the guard frame. Besides, since the guard frame extends in the forward and backward direction just below the shift actuator and is connected to the vehicle body frame and therefore is less likely to appear on the outer appearance of the vehicle, it does not impair the outer appearance of the vehicle. Accordingly, both of protection of the shift actuator and enhancement of the outer appearance of the vehicle can be anticipated.

Further, according to the embodiment, the saddle riding vehicle has, in addition to the first aspect, a second aspect that the guard member is removably connected to the guard frame.

According to the second aspect of the embodiment, even if the guard member is damaged by contact with an obstacle, repair can be carried out only by removing only the guard member from the guard frame and replacing the guard member with a new part. Consequently, the repair cost can be suppressed low.

Further, according to the embodiment, the saddle riding vehicle has, in addition to the first or second aspect, a third aspect that a recessed portion which is open to an upper face is formed on an inner side face of the guard member, and a lower portion of the shift actuator is accommodated in the recessed portion such that a lower face and an outer side face of the shift actuator are covered with the guard member.

According to the third aspect of the embodiment, since the lower portion of the shift actuator is accommodated in the recessed portion on the inner side face of the guard member to cover the lower face and the outer side face of the actuator. Therefore, the lower face and the outer side face of the shift actuator can be covered with the single guard member, simplification in structure can be anticipated, and accordingly, it is easy to form this guard member from synthetic resin or by die-casting and provide the same at a low cost.

Furthermore, according to the embodiment, the saddle riding vehicle has, in addition to the first aspect, a fourth aspect that the vehicle body frame includes a head pipe for supporting a front fork, on which the front wheel is supported for rotation, for steering movement, a main frame extending rearwardly from the head pipe, a down frame extending downwardly from the head pipe, and a pivot frame extending downwardly from a rear portion of the main frame and supporting a rear fork, on which the rear wheel is supported for rotation, for upward and downward rocking motion through a pivot shaft, and a front end portion and a rear end portion of the guard frame are connected to a lower end portion of the down frame and a lower end portion of the pivot frame, respectively.

According to the fourth aspect of the embodiment, the supporting strength of the guard frame is reinforced by the down frame and the pivot frame, and the protecting function for the shift actuator can be enhanced. Besides, the guard frame cooperates with the head pipe, main frame, down frame and pivot frame to configure a loop-shaped frame structure, and this can contribute to reinforcement of the rigidity of the vehicle body frame.

Furthermore, according to the embodiment, the saddle riding vehicle has, in addition to the first to fourth aspects, a fifth aspect that a cover which covers the guard frame in a state in which an outer side face of the guard member is exposed is attached to the actuator guard means. Incidentally, the cover corresponds to the left side cover 98 described above.

According to the fifth aspect of the embodiment, since the cover for covering the guard frame in a state in which the outer side face of the guard member is exposed is attached to the actuator guard means, the sideward outer appearance of the power unit can be improved, and an obstacle approaching from sidewardly can be received by the guard member to prevent damage to the cover.

Furthermore, according to the embodiment, the saddle riding vehicle has, in addition to the first aspect, a sixth aspect that a grounding projection which is brought into contact with the ground earlier than the cover when the vehicle falls sideways is formed on an outer side face of the guard member.

According to the sixth aspect of the embodiment, when the vehicle falls sideways to the shift actuator side, the grounding projection provided in a projecting manner on the outer side face of the guard member is brought into contact with the road surface, and consequently, the sideways falling posture of the vehicle can be controlled readily. Besides, since the grounding projection is brought into contact with the ground earlier than the cover, it plays a roll of moderating the ground contacting impact of the cover and can moderate damage to the cover.

Obviously, numerous modifications and variations of the present invention are possible in light of the above teachings. It is therefore to be understood that within the scope of the appended claims, the invention may be practiced otherwise than as specifically described herein.

What is claimed is:

1. A saddle riding vehicle comprising:
a vehicle body frame;
a front wheel connected to the vehicle body frame;
a rear wheel connected to the vehicle body frame;
a power unit provided between the front wheel and the rear wheel and supported by the vehicle body frame, the power unit having a transmission and a shift mechanism for the transmission;
a shift actuator to actuate the shift mechanism and attached to a lower portion of a side face of the power unit;
an actuator guard to protect the shift actuator from an obstacle and comprising:
a guard frame extending in a forward and backward direction of the saddle riding vehicle below the shift actuator and connected to the vehicle body frame; and
a guard member connected to the guard frame and covering a lower face and an outer side face of the shift actuator;
a front fork supporting the front wheel in a rotatable manner; and
a rear fork supporting the rear wheel in a rotatable manner,
wherein the vehicle body frame comprises
a head pipe supporting the front fork for steering movement,
a main frame extending rearwardly from the head pipe,
a down frame extending downwardly from the head pipe, and
a pivot frame extending downwardly from a rear portion of the main frame and supporting the rear fork for upward and downward rocking motion through a pivot shaft, and
wherein the guard frame includes a front end portion and a rear end portion, the front end portion being connected to a lower end portion of the down frame, the rear end portion being connected to a lower end portion of the pivot frame.

2. The saddle riding vehicle according to claim 1, wherein the guard member is removably connected to the guard frame.

3. The saddle riding vehicle according to claim 1,
wherein the guard member includes a recessed portion which is open to an upper face and provided on an inner side face of the guard member, and
wherein a lower portion of the shift actuator is accommodated in the recessed portion such that a lower face and an outer side face of the shift actuator are covered with the guard member.

4. The saddle riding vehicle according to claim 1, further comprising:
a cover covering the guard frame in a state in which an outer side face of the guard member is exposed,
wherein the cover is attached to the actuator guard.

5. The saddle riding vehicle according to claim 1,
wherein the actuator guard further comprises a fixing member removably connecting the guard member to the guard frame.

6. The saddle riding vehicle according to claim 1,
wherein the guard frame includes a first frame portion provided below the shift actuator and connected to the vehicle body frame, and
wherein the guard member is connected to the first frame portion.

7. A saddle riding vehicle comprising:
a vehicle body frame;
a front wheel connected to the vehicle body frame;
a rear wheel connected to the vehicle body frame;
a power unit provided between the front wheel and the rear wheel and supported by the vehicle body frame, the power unit having a transmission and a shift mechanism for the transmission;
a shift actuator to actuate the shift mechanism and attached to a lower portion of a side face of the power unit;
an actuator guard to protect the shift actuator from an obstacle and comprising:
  a guard frame extending in a forward and backward direction of the saddle riding vehicle below the shift actuator and connected to the vehicle body frame; and
  a guard member connected to the guard frame and covering a lower face and an outer side face of the shift actuator; and
a cover covering the guard frame in a state in which an outer side face of the guard member is exposed,
wherein the cover is attached to the actuator guard, and
wherein the actuator guard further comprises a grounding projection provided in contact with a ground earlier than the cover when the vehicle falls sideways, the grounding projection being provided on an outer side face of the guard member.

8. The saddle riding vehicle according to claim 7,
wherein the grounding projection extending from the guard member in a vehicle widthwise direction of the saddle riding vehicle.

9. A saddle riding vehicle comprising:
a vehicle body frame;
a front wheel connected to the vehicle body frame;
a rear wheel connected to the vehicle body frame;
a power unit provided between the front wheel and the rear wheel and supported by the vehicle body frame, the power unit having a transmission and a shift mechanism for the transmission;
a shift actuator to actuate the shift mechanism and attached to a lower portion of a side face of the power unit; and
an actuator guard to protect the shift actuator from an obstacle and comprising:
  a guard frame extending in a forward and backward direction of the saddle riding vehicle below the shift actuator and connected to the vehicle body frame; and
  a guard member connected to the guard frame and covering a lower face and an outer side face of the shift actuator,
wherein the guard member includes a first guard portion and a second guard portion,
wherein the first guard portion is connected to the guard frame and is provided under the shift actuator, and
wherein the second guard portion extends upward from the first guard portion and is provided on an outer side of the outer side face of the shift actuator in a vehicle widthwise direction of the saddle riding vehicle.

10. A saddle riding vehicle comprising:
a vehicle body frame;
a front wheel connected to the vehicle body frame;
a rear wheel connected to the vehicle body frame;
a power unit provided between the front wheel and the rear wheel and supported by the vehicle body frame, the power unit having a transmission and a shift mechanism for the transmission;
a shift actuator to actuate the shift mechanism and attached to a lower portion of a side face of the power unit; and
an actuator guard to protect the shift actuator from an obstacle and comprising:
  a guard frame extending in a forward and backward direction of the saddle riding vehicle below the shift actuator and connected to the vehicle body frame; and
  a guard member connected to the guard frame and covering a lower face and an outer side face of the shift actuator,
wherein the guard frame includes a first frame portion provided below the shift actuator and connected to the vehicle body frame,
wherein the guard member is connected to the first frame portion, and
wherein the guard member includes a second frame portion extending from the first frame portion in the forward and backward direction and provided below the power unit, the second frame being connected to the vehicle body frame.

* * * * *